Patented May 6, 1924.

1,492,921

UNITED STATES PATENT OFFICE.

HAROLD P. KNIGHT, OF BOROSOLVAY, THOMAS M. CRAMER, OF OAKLAND, AND GEORGE A. CONNELL, OF ALAMEDA, CALIFORNIA, ASSIGNORS TO PACIFIC COAST BORAX COMPANY, A CORPORATION OF NEVADA.

PROCESS OF PRODUCING SODIUM BORATES.

No Drawing.  Application filed May 25, 1922.  Serial No. 563,669.

*To all whom it may concern:*

Be it known that we, HAROLD P. KNIGHT, of Borosolvay, San Bernardino County, THOMAS M. CRAMER, of Oakland, Alameda County, and GEORGE A. CONNELL, of Alameda, Alameda County, all in the State of California, and all citizens of the United States, have invented a certain new and useful Process of Producing Sodium Borates, of which the following is a specification.

The invention relates to a process of producing sodium borates such as sodium tetraborate or borax.

An object of the invention is to provide a process of obtaining sodium borate from liquors obtained from the decomposition of borate ores or salines containing borax or metaborate.

Another object of the invention is to provide a process of obtaining sodium borate from such liquors without the use of the materials now customarily used, such as trona, sodium bicarbonate or carbon dioxide.

The invention possesses other advantageous features, some of which, with the foregoing, will be set forth at length in the following description where we shall outline in full, the process of our invention and one method of carrying it into effect.

We have found that borax ($Na_2B_4O_7$) will react with sodium carbonate ($Na_2CO_3$), in aqueous solution, to form sesquicarbonate of soda ($Na_2CO_3 \cdot NaHCO_3$) and sodium metaborate ($NaBO_2$) in accordance with the following reversible reaction:—

$$4Na_2CO_3 + Na_2B_4O_7 + H_2O = 2(Na_2CO_3 \cdot NaHCO_3) + 4NaBO_2$$

The molecular proportions of this reaction are as follows:—

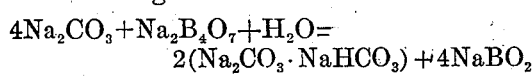

424+202+18=380+264.

We have found that this reaction takes place under a wide variety of conditions and that the presence in the solution of certain neutral salts, such as sodium chloride, aids in the progress of the reaction by rendering the sodium sesquicarbonate less soluble and thereby causing it to crystallize out of solution.

We make use of this reaction to obtain liquors and natural brines more concentrated with respect to $B_2O_3$, through the conversion of the less soluble tetraborate to the more soluble metaborate. This can be made to take place, for example, in solar ponds where evaporation is effected at the natural temperatures prevailing, as at Owens Lake and Searles Lake in California.

With a solution containing the components of the reaction represented above, we have found that the addition of carbon dioxide under certain conditions will result in the conversion of monoborate present in solution to borax, and some of this borax will react with the sodium carbonate present to form sodium sesquicarbonate. An equilibrium is established that results in the formation and crystallization of borax and sodium sesquicarbonate together. We have found that this crystallization occurs favorably under temperature conditions ranging from 25° C. to 40° C., but we do not desire to limit ourselves to such temperature range since the mixture may be crystallized out at other temperatures. When it is desirable to increase the yield of the mixture of crystals, the temperature of the carbonated solution may be reduced. When a solution is obtained wherein both the sodium tetraborate and sodium sesquicarbonate are saturated at a given temperature and the solution is maintained at that temperature, the further addition of carbon dioxide will result in the crystallization of a mixture of sodium tetraborate and sodium sesquicarbonate in approximately the molecular proportions given in the above reaction, that is, 202 parts anhydrous sodium tetraborate and 380 parts anhydrous sodium sesquicarbonate.

Such solutions are obtainable from natural saline lakes such as Searles Lake and Owens Lake in California. The liquors from these lakes are saturated or approximately saturated with sodium sesquicarbonate. When the solution or the lake brine is too dilute, that is, when too much water is present to permit the crystallizing out of the sodium tetraborate and sodium sesquicarbonate upon the maximum carbon dioxide addition, the solution or brine is preferably evaporated to saturation with sodium sesquicarbonate and approximate saturation with $B_2O_3$ in the form of borax and monoborate. The carbon dioxide gas should not be introduced into the solution at a greater rate than the rate of crystallization of the sesquicarbonate, since a more rapid introduction of the carbon dioxide may result in converting the sesquicarbonate to the bicarbonate. The carbon dioxide reacts both with the sodium carbonate and the sodium metaborate to form sodium sesquicarbonate and sodium tetraborate in accordance with the following reactions:

$$3Na_2CO_3 + CO_2 + H_2O = 2(Na_2CO_3 \cdot NaHCO_3)$$
$$4NaBO_2 + CO_2 = Na_2CO_3 + Na_2B_4O_7$$

The sesquicarbonate and the tetraborate crystallize out together, forming a mixture of the two salts in approximately molecular proportions.

Mixtures of varying proportions of bicarbonate, trona and borax have been heretofore produced, but, to our knowledge, had no commercial value. We have found that such mixtures, as well as our mixture of sesquicarbonate and borax in approximately molecular proportions, may be advantageously employed in the commercial manufacture of sodium borates, such as borax.

In the manufacture of borax, from liquors containing sodium metaborate, such for instance as are obtained from the decomposition of borate ores or from saline liquors, it has been customary to convert the metaborate to tetraborate, by treating the liquor, while hot, with trona, sodium bicarbonate or carbon dioxide. We have found that this conversion may be accomplished by the use of the above mixture of sodium sesquicarbonate and sodium tetraborate. In accordance with our invention we mix the mixture of crystals, or an aqueous solution thereof, with the said liquor while hot, whereby the metaborate is converted into the tetraborate in accordance with the following reaction.

$$4NaBO_2 + 2(Na_2CO_3 \cdot NaHCO_3) + Na_2B_4O_7 = Na_2B_4O_7 + 4Na_2CO_3 + Na_2B_4O_7$$

The tetraborate is recovered from the resultant solution by cooling, whereupon tetraborate crystallizes out and is readily recoverable.

Throughout the specification, we have used the formulæ of the anhydrous salts, for the purpose of convenience, but it is to be understood that water of crystallization is always present.

We claim:—

1. The method of producing sodium tetraborate from a mixture of sodium tetraborate and sodium sesquicarbonate which comprises bringing together the sodium tetraborate and sodium sesquicarbonate and sodium metaborate in a hot aqueous solution whereby the metaborate is converted into tetraborate and the sesquicarbonate is converted into sodium carbonate and cooling the solution to crystallize out tetraborate.

2. The method of producing sodium tetraborate from a mixture of sodium tetraborate and sodium sesquicarbonate in substantially molecular proportions which comprises bringing together the sodium tetraborate and sodium sesquicarbonate and sodium metaborate in a hot aqueous solution whereby the metaborate is converted into tetraborate and the sesquicarbonate into sodium carbonate and cooling the solution to crystallize out tetraborate.

In witness whereof we have hereunto set our hands, the said HAROLD P. KNIGHT, at Borosolvay, California, this 11th day of May, 1922; and the said THOMAS M. CRAMER and GEORGE A. CONNELL, at San Francisco, California, this 8th day of May, 1922.

HAROLD P. KNIGHT.
THOMAS M. CRAMER.
GEORGE A. CONNELL.